United States Patent [19]
Chon

[11] Patent Number: 5,301,033
[45] Date of Patent: Apr. 5, 1994

[54] CIRCUIT FOR PREVENTING FALSE DETECTION OF VIDEO SYNC PULSES IN A VIDEO SIGNAL WHICH ALSO CONTAINS COPY GUARD SIGNALS

[75] Inventor: Byung-hoan Chon, Seoul, Rep. of Korea

[73] Assignee: Samsung Electronics Co., Ltd., Kyungki-do, Rep. of Korea

[21] Appl. No.: 10,248

[22] Filed: Jan. 28, 1993

[30] Foreign Application Priority Data

Mar. 23, 1992 [KR] Rep. of Korea ............... 92-4782

[51] Int. Cl.$^5$ .................... H04N 5/91; H04N 5/04
[52] U.S. Cl. ........................... 358/335; 380/15; 360/37.1; 348/521
[58] Field of Search ............ 358/335, 154, 158, 148, 358/153, 150, 147, 155; 380/5, 15; 360/37.1; H04N 5/91, 5/04

[56] References Cited

U.S. PATENT DOCUMENTS

| | | | |
|---|---|---|---|
| 4,025,952 | 5/1977 | Eckenbrecht | 358/158 |
| 4,556,905 | 12/1985 | Ikejiri | 358/154 |
| 4,631,603 | 12/1986 | Ryan | 358/335 |
| 4,695,901 | 9/1987 | Ryan | 380/5 |
| 4,792,852 | 12/1988 | Narusawa | 358/154 |
| 5,133,008 | 7/1992 | Fujita | 380/5 |
| 5,194,965 | 3/1993 | Quan | 358/335 |

FOREIGN PATENT DOCUMENTS

| | | | |
|---|---|---|---|
| 0166372 | 7/1988 | Japan | H04N 5/278 |
| 4-142189 | 5/1992 | Japan | H04N 5/91 |

*Primary Examiner*—James J. Groody
*Assistant Examiner*—Chris Grant
*Attorney, Agent, or Firm*—Robert A. Westerlund; Charles R. Donohoe

[57] ABSTRACT

A circuit for preventing the false detection of vertical sync pulses included in a video signal which also includes copy guard signals inserted in predetermined intervals thereof, including signal generating circuitry which is responsive to vertical sync pulses separated from the video signal for generating a corrected vertical sync signal, and inhibit circuitry for rendering the signal generating circuitry non-responsive to the separated vertical sync pulses during the predetermined intervals of the video signal, thereby preventing any falsely detected vertical sync pulses due to misinterpretation of the copy guard signals from being included in the corrected vertical sync signal. The inhibit circuitry preferably functions to count a predetermined number of horizontal sync pulses also included in the video signal before allowing any change in the output of the signal generating circuitry. The predetermined number is selected to ensure that the time required to count the predetermined number of horizontal sync pulses is greater than the predetermined intervals of the video signal corresponding to the repetition rate of the copy guard signals.

23 Claims, 2 Drawing Sheets

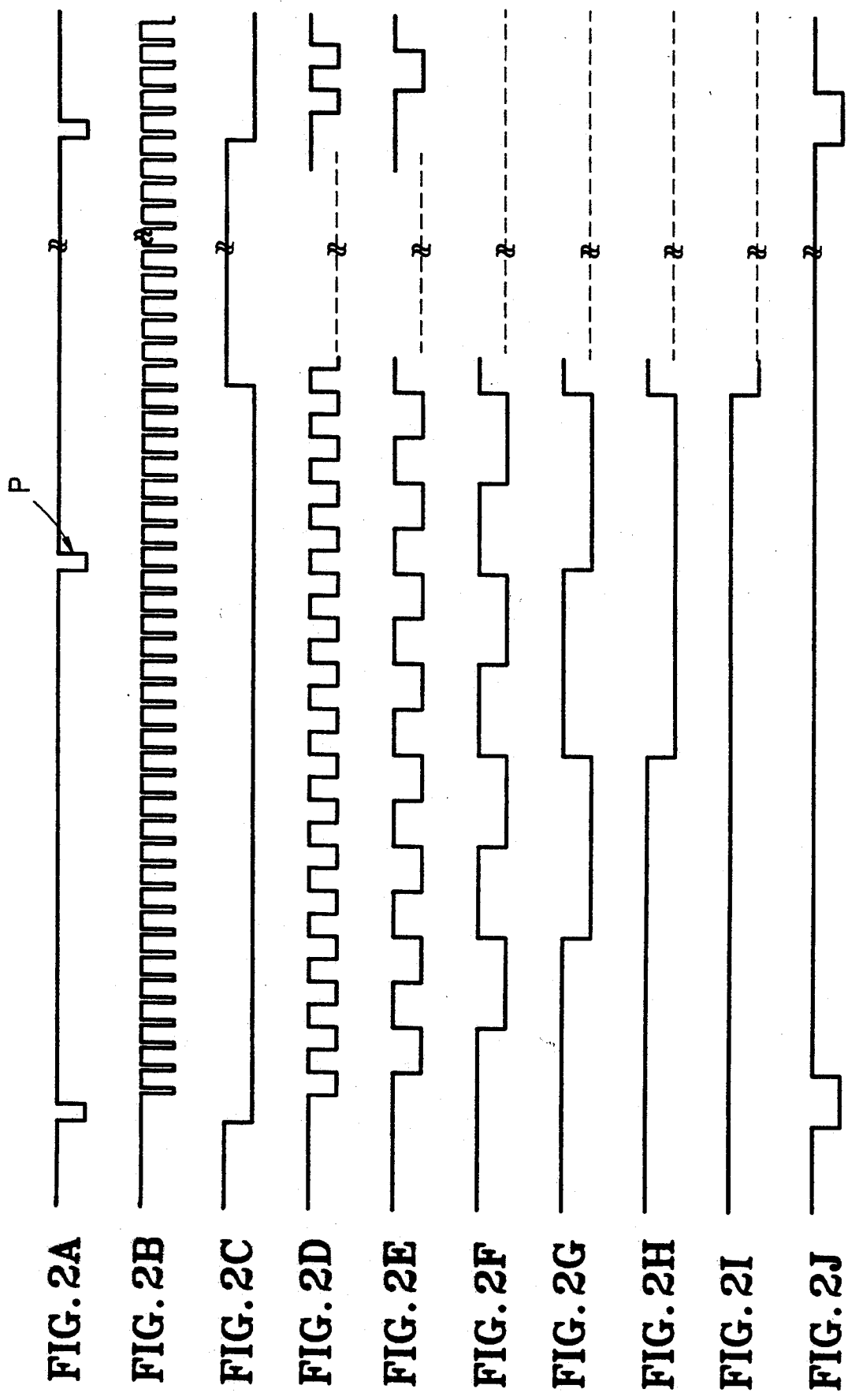

CIRCUIT FOR PREVENTING FALSE DETECTION OF VIDEO SYNC PULSES IN A VIDEO SIGNAL WHICH ALSO CONTAINS COPY GUARD SIGNALS

BACKGROUND OF THE INVENTION

The present invention relates generally to video screen display drivers, and more particularly, to a vertical sync pulse detector therefor which functions to prevent false detection of vertical sync pulses due to the presence of a copy guard signal in a video signal being displayed on the video screen display by the video screen display driver.

In general, video screen display drivers include a vertical sync pulse detector which detects vertical sync pulses included in a video signal (e.g., an NTSC composite video signal). The detected vertical sync pulses are then extracted and separated from the video signal and utilized to properly synchronize the operation of the video screen display driver (e.g., the vertical sweep circuit thereof). If this synchronization is not accurate, the on-screen video display will be distorted.

In order to prevent the unauthorized copying of video signals (e.g., video stored on a videotape) by means of a videotape recorder (VTR), a copy guard signal is included in the video signal supplied to the VTR. The copy guard signal is generally inserted in 21 horizontal sync intervals of the video signal.

A problem which has arisen as a result of the utilization of such copy guard signals is that the vertical sync pulse detector circuit misinterprets the copy guard signal as a vertical sync pulse, thereby upsetting the synchronization of the video screen display driver, and consequently, distorting the on-screen video display.

Based on the above, it can be appreciated that there presently exists a need for a video sync pulse detector circuit which eliminates the above-identified problem with presently available video sync pulse detector circuits. The present invention fulfills this need.

SUMMARY OF THE INVENTION

The present invention encompasses a circuit for preventing the false detection of vertical sync pulses included in a video signal which also includes copy guard signals inserted in predetermined intervals thereof, including signal generating circuitry which is responsive to vertical sync pulses separated from the video signal for generating a corrected vertical sync signal, and inhibit circuitry for rendering the signal generating circuitry non-responsive to the separated vertical sync pulses during the predetermined intervals of the video signal, thereby preventing any falsely detected vertical sync pulses due to misinterpretation of the copy guard signals from being included in the corrected vertical sync signal. The inhibit circuitry preferably functions to count a predetermined number of horizontal sync pulses also included in the video signal before allowing any change in the output of the signal generating circuitry. The predetermined number is selected to ensure that the time required to count the predetermined number of horizontal sync pulses is greater than the predetermined intervals of the video signal corresponding to the repetition rate of the copy guard signals. In a presently preferred embodiment of the present invention, the signal generating circuitry comprises a pair of cross-coupled D-type flip-flops, and the inhibit circuitry comprises a plurality of sequentially connected T-type flip-flops.

BRIEF DESCRIPTION OF THE DRAWINGS

These and various other features and advantages of the present invention will be readily understood with reference to the following detailed description taken in conjunction with the accompanying drawings, wherein like reference numerals designate like structural elements, and, in which:

FIG. 2A depicts the vertical sync pulses generated by vertical sync pulse detector;

FIG. 2B depicts the horizontal sync pulses generated by a horizontal sync pulse detector;

FIG. 2C depicts the output signal from the inverted output terminal /Q of D flip-flop D1 of the circuit illustrated in FIG. 1;

FIG. 2D depicts the output signal from the inverted output terminal /Q of T flip-flop T1 of the circuit illustrated in FIG. 1;

FIG. 2E depicts the output signal from the inverted output terminal /Q of T flip-flop T2 of the circuit illustrated in FIG. 1;

FIG. 2F depicts the output signal from the inverted output terminal /Q of T flip-flop T3 of the circuit illustrated in FIG. 1;

FIG. 2G depicts the output signal from the inverted output terminal /Q of T flip-flop T4 of the circuit illustrated in FIG. 1;

FIG. 2H depicts the output signal from the inverted output terminal /Q of T flip-flop T5 of the circuit illustrated in FIG. 1;

FIG. 2I depicts the output signal from the inverted output terminal /Q of T flip-flop T6 of the circuit illustrated in FIG. 1; and, FIG. 2J depicts the output signal from the inverted output terminal /Q of D flip-flop D2 of the circuit illustrated in FIG. 1, which constitutes the final output of the circuit illustrated in FIG. 1, i.e., a vertical sync signal with all falsely detected sync pulses removed therefrom.

DETAILED DESCRIPTION OF THE INVENTION

Figure 1:
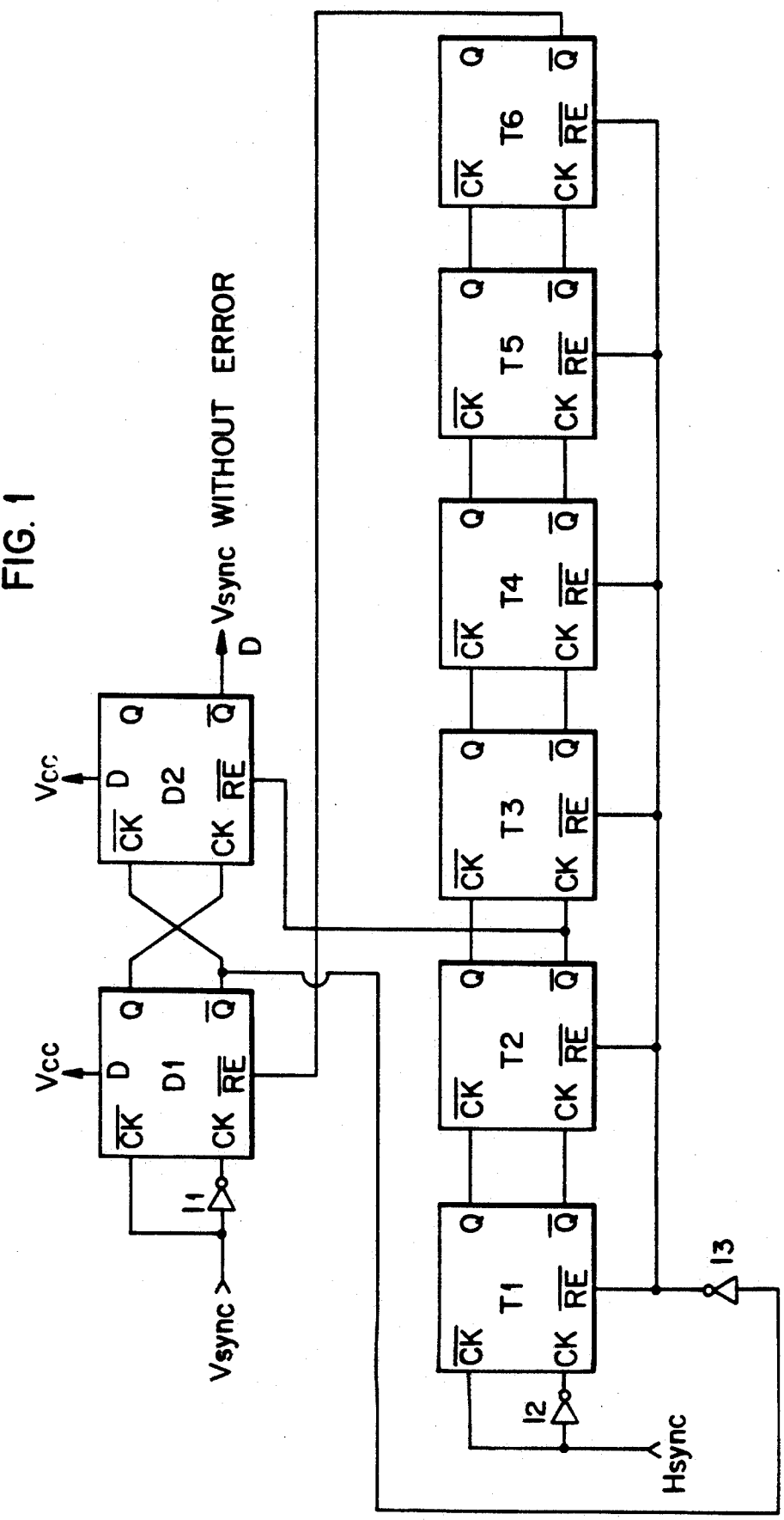
FIG. 1 is a functional block diagram of a circuit constructed in accordance with the present invention.

With reference now to FIG. 1, there can be seen a functional block diagram of a circuit constructed in accordance with a preferred embodiment of the present invention. This circuit may conveniently be incorporated within the vertical sync separator of the video screen display driver (not shown) wherein it is to be employed, or may be provided as a separate component thereof. The relative configuration of this circuit is not a limiting feature of the present invention.

The circuit of the present invention includes a signal generating portion comprised of a first D-type flip-flop D1 and a second D-type flip-flop D2 interconnected as shown in FIG. 1. More particularly, the first flip-flop D1 has a non-inverted clock signal terminal CK which is coupled to the output of inverter I1 whose input is coupled to a train of vertical sync pulses, Vsync, included within the video signal (not shown) to be displayed on the video screen display (not shown) driven by the video-screen display driver. Thus, the inverted vertical sync pulses are applied to the non-inverted clock signal terminal CK of the first flip-flop D1. The non-inverted vertical sync pulses are applied to the inverted clock signal terminal /CK of the first flip-flop D1. The first flip-flop D1 is also provided with a data input terminal D which is coupled to a power supply voltage Vcc, and a reset terminal /RE whose function will become apparent hereinafter. The non-inverted output terminal Q of the first flip-flop D1 is coupled to the non-inverted clock signal terminal CK of the second flip-flop D2. The inverted output terminal /Q of the first flip-flop D1 is coupled to the inverted clock signal terminal /CK of the second flip-flop D2. The data input terminal D of the second flip-flop D2 is also coupled to the power supply voltage Vcc. The function of the reset terminal /RE of the second flip-flop D2 will also become apparent hereinafter.

With continuing reference to FIG. 1, it can be seen that the circuit of the present invention also includes a control portion comprised of six serially connected T-type flip-flops T1–T6 coupled to the signal generating portion as shown. More particularly, the reset terminal /RE of the first T-type flip-flop T1 is coupled to the output of an inverter 13 whose input is coupled to the inverted output terminal /Q of the first D-type flip-flop D1. The non-inverted clock signal terminal CK of the first T-type flip-flop is coupled to the output of an inverter 12 whose input is coupled to a train of horizontal sync pulses, Hsync, also included in the video signal. Thus, the non-inverted clock signal terminal CK of the first T-type flip-flop T1 is coupled to the inverse of the horizontal sync pulses. As can be readily seen, the non-inverted clock signal terminal CK of each successive T-type flip-flop T2–T6 is coupled to the inverted output terminal /Q of the immediately preceding one of the flip-flops T2–T6, and the inverted clock signal terminal /CK of each successive T-type flip-flop T2–T6 is coupled to the non-inverted output terminal Q of the preceding one of the flip-flops T2–T6. The inverted output terminal /Q of the second T-type flip-flop T2 is coupled to the reset terminal /RE of the second D-type flip-flop D2, and the inverted output terminal /Q of the sixth (final) T-type flip-flop T6 is coupled to the reset terminal /RE of the first D-type flip-flop D1.

With additional reference now to FIGS. 2A–2J, the operation of the above-described circuit of the preferred embodiment of the present invention will now be explained. In the first place, the vertical sync pulses Vsync separated from the video signal are shown in FIG. 2A. The pulse P represents a copy guard signal, also included within the video signal which has been misinterpreted as a vertical sync pulse by the vertical sync pulse separator. It is the basic purpose of the circuit of the present invention to produce a corrected vertical sync signal with all such falsely detected vertical sync pulses removed therefrom. Typically, the interval between consecutive copy guard signals is approximately 21 horizontal sync pulses of the video signal.

FIG. 2B depicts the horizontal sync pulses, Hsync, also separated from the video signal. As will become clear hereinafter, the control portion of the circuit of the present invention illustrated in FIG. 1 functions to generate an output signal which, in effect, disables the first D-type flip-flop D1 of the signal generating portion of the circuit at least during the above-described copy guard signal interval, thereby inhibiting any change in the output thereof during this time period. During this interval, since the output of the first D-type flip-flop D1 is inhibited, the output of the second D-type flip-flop D2 is also inhibited. Therefore, during this interval, the signal generating portion of the circuit is disabled, in the sense that its output is inhibited from changing. Otherwise stated, the signal generating portion of the circuit is rendered non-responsive to the vertical sync pulses, Vsync, during this interval.

In the preferred embodiment of the present invention, the interval during which the signal generating portion of the circuit is disabled or inhibited, is selected to be an interval corresponding to the occurrence of 31 horizontal sync pulses, although this is not limiting to the present invention. Thus, the control portion of the circuit is, in essence, a modulo-n counter, (with n being set to 32), comprised of six successive counter stages T1–T6, with the final counter stage T6 only being used to generate the final output signal which is applied as a control signal to the reset terminal /RE of the first D-type flip-flop D1 of the signal generating portion of the circuit.

More particularly, each successive counter stage is comprised of a T-type flip-flop connected to function as a divide-by-two circuit, as is evident from the output waveforms of the T-type flip-flops T1–T6 depicted in FIGS. 2D–2I, respectively, wherein it can be seen that the frequency of the output of each successive T-type flip-flop is one-half the frequency of the output of the preceding T-type flip-flop. It should also be appreciated that each T-type flip-flop TI–T6 is reset upon the output /Q of the first D-type flip-flop D1 going from a high logic level to a low logic level, which corresponds to the receipt of a vertical sync pulse, Vsync. Therefore, after the first D-type flip-flop D1 receives a vertical sync pulse, Vsync, each of the T-type flip-flops T1–T6 is reset, and the sequentially connected flip-flops T1–T6 begin to count the number of horizontal sync pulses, Hsync, received by the first T-type flip-flop T1. After 32 horizontal sync pulses are counted, the inverted output terminal /Q of the final stage T6 goes low, thereby resetting the D-type flip-flop D1, thus driving the inverted output terminal /Q thereof high, as can be seen in FIG. 2C. Consequently, the first D-type flip-flop D1 is rendered responsive to the next incoming vertical sync pulse, Vsync. As such, when the flip-flop D1 receives the next vertical sync pulse, its inverted output terminal /Q is driven from its high logic level to its low logic level, thereby driving the inverted output terminal /Q of the second D-type flip-flop D2 from its logic high level to its logic low level.

It should be appreciated that the output signal ("Vsync without error") appearing at the inverted output terminal /Q of the second D-type flip-flop D2 is a corrected version of the vertical sync signal ("Vsync") appearing at the input to the first D-type flip-flop D1, since the falsely detected vertical sync pulse P which is present in the vertical sync signal, Vsync, is masked therefrom. The width of this output signal, Vsync without error, is determined by the resetting of the second D-type flip-flop D2.

In the preferred embodiment, as shown in FIGS. 1, 2E, and 2J, the inverted output terminal /Q of the second T-type flip-flop T2 is coupled to the reset terminal /RE of the second D-type flip-flop D2, so that when the signal appearing at the inverted output terminal /Q of the flip-flop T2 goes low, the output signal appearing at the inverted output terminal /Q of the flip-flop D2 goes high. However, the pulse width of the corrected vertical sync signal output by the flip-flop D2 is not limiting to the present invention.

Although a preferred embodiment of the present invention has been described in detail hereinabove, it should be clearly understood that many variations and/or modifications of the basic inventive concepts herein taught which may appear to those skilled in the pertinent art will still fall within the spirit and scope of the present invention, as defined in the appended claims. For example, many different types of timer, counter, or reset circuits could be utilized in place of the above-described control portion of the overall circuit of the present invention to perform the same or equivalent functions, and further, many different types of signal generating circuits could be employed in place of the above-described signal generating portion of the overall circuit of the present invention, to perform the same of equivalent functions.

What is claimed is:

1. A circuit for preventing the false detection of vertical sync pulses included in a video signal which also includes copy guard signals inserted in predetermined intervals thereof, comprising:
   signal generating means responsive to vertical sync pulses separated from said video signal for generating a correct vertical sync signal at a sync signal output terminal thereof, wherein said signal generating means comprises:
   first flip-flop means, including:
      an inverted clock signal terminal coupled to said separated vertical sync pulses;
      a non-inverted clock signal signal terminal coupled to the inverse of said separated vertical sync pulses;
      an inverted output terminal;
      a non-inverted output terminal;
      a data input terminal coupled to a power supply voltage; and,
      a reset terminal coupled to a first output signal of a disabling means; and,
   second flip-flop means, including:
      an inverted clock signal terminal coupled to said inverted output terminal of said first flip-flop means;
      a non-inverted clock signal terminal coupled to said non-inverted output terminal of said flip-flop means;
      a data input terminal coupled to said power supply voltage;
      a reset terminal coupled to a second output signal of said disabling means;
      a non-inverted output terminal; and,
      an inverted output terminal, which comprises said sync signal output terminal of said signal generating means; and,
   disabling means for rendering said signal generating means non-responsive to said separated vertical sync pulses at least during said predetermined intervals of said video signal, thereby preventing any falsely detected vertical sync pulses from being included in said correct vertical sync signal.

2. The circuit as set forth in claim 1, wherein said disabling means is responsive to horizontal sync pulses also included in said video signal.

3. The circuit as set forth in claim 1, wherein said disabling means comprises a first portion for detecting the lapse of each said predetermined interval of said video signal, and for generating said first output signal upon detection of the lapse of each said predetermined interval.

4. The circuit as set forth in claim 3, wherein said disabling means further comprises a second portion for generating said second output signal upon the lapse of a predetermined time period, wherein said predetermined time period governs the pulse width of individual pulses of said correct vertical sync signal.

5. The circuit as set forth in claim 1, wherein said disabling means comprises a counter adapted to count, during each cycles of its operation, a plurality n of horizontal sync pulses also included in said video signal, and to generate said first output signal upon counting said n horizontal sync pulses, wherein n is selected to ensure that the time required to count said n horizontal sync pulses is greater than said predetermined interval of said video signal.

6. The circuit as set forth in claim 5, wherein said counter comprises a plurality of sequentially connected counter stages.

7. The circuit as set forth in claim 6, wherein each of said counter stages comprises a flip-flop.

8. The circuit as set forth in claim 6, wherein each of said counter stages comprises a divide-by-two circuit.

9. The circuit as set forth in claim 8, wherein each said divide-by-two circuit comprises a T-type flip-flop.

10. The circuit as set forth in claim 1, wherein said disabling means comprises means for counting horizontal sync pulses also included in said video signal and for producing a control signal having a first logic level at the start of each operating cycle thereof, and for driving said control signal to a second logic level upon counting a predetermined number n of said horizontal sync pulses, whereby said signal generating means is inhibited from changing the level of said correct vertical sync signal when said control signal is at said first logic level.

11. The circuit as set forth in claim 10, wherein said counting means is initialized to zero in response to each said vertical sync pulse included in said video signal, and wherein said predetermined number n is selected to ensure that the time required to count said predetermined number n of horizontal sync pulses is greater than said predetermined intervals of said video signal.

12. The circuit as set forth in claim 1, wherein said first and second flip-flop means each comprise a D-type flip-flop.

13. The circuit as set forth in claim 1, wherein said disabling means comprises a plurality of sequentially connected flip-flops having an input coupled to horizontal sync pulses also included in said video signal, a first output coupled to said reset terminal of said first flip-flop means, and a second output coupled to said reset terminal of said second flip-flop means.

14. The circuit as set forth in claim 13, wherein each successive one of said sequentially connected flip-flops of said disabling means produces a binary output signal whose logic state changes in response to said binary output signal of the preceding one of said flip-flops going from a first logic state to a second logic state.

15. The circuit as set forth in claim 14, wherein each one of said flip-flops of said disabling means comprises a T-type flip-flop.

16. A circuit for preventing the false detection of vertical sync pulses included in a video signal which also includes copy guard signals inserted in predetermined intervals thereof, comprising:
   signal generating circuitry responsive to vertical sync pulses separated from said video signal for generating a correct vertical sync signal at a sync signal output terminal thereof, said signal generating circuitry including a pair of cross-coupled flip-flops; and, disabling circuitry for rendering said signal generating circuitry non-responsive to said separated vertical sync pulses at least during said predetermined intervals of said video signal.

17. The circuit as set forth in claim 16, wherein said signal generating circuitry is directly coupled to said vertical sync pulses.

18. The circuit as set forth in claim 17, wherein said disabling circuitry includes a counter for counting horizontal sync pulses also included in said video signal and for producing a control signal having a first logic level at the start of each operating cycle thereof, and for driving said control signal to a second logic level upon counting a predetermined number n of said horizontal sync pulses, wherein said control signal is coupled to said signal generating circuitry, said signal generating circuitry being inhibited from changing the level of said correct vertical sync signal when said control signal is at said first logic level.

19. The circuit as set forth in claim 17, wherein said disabling circuitry is coupled to horizontal sync pulses also included in said video signal.

20. A circuit for preventing the false detection of vertical sync pulses included in a video signal which also includes copy guard signals inserted in predetermined intervals thereof, comprising:

signal generating circuitry directly coupled to vertical sync pulses separated from said video signal for generating a correct vertical sync signal at a sync signal output terminal thereof; and, disabling circuitry responsive to horizontal sync pulses also included in said video signal for rendering said signal generating circuitry non-responsive to said separated vertical sync pulses at least during said predetermined intervals of said video signal.

21. The circuit as set forth in claim 20, wherein said disabling circuitry includes a counter for counting horizontal sync pulses also included in said video signal and for producing a control signal having a first logic level at the start of each operating cycle thereof, and for driving said control signal to a second logic level upon counting a predetermined number n of said horizontal sync pulses, wherein said control signal is coupled to said signal generating circuitry, said control signal is coupled to said signal generating circuitry, said signal generating circuitry being inhibited from changing the level of said correct vertical sync signal when said control signal is at said first logic level.

22. The circuit as set forth in claim 20, wherein said disabling circuitry includes a counter.

23. The circuit as set forth in claim 22, wherein said counter is directly coupled to said horizontal sync pulses.

* * * * *